Patented Nov. 1, 1932

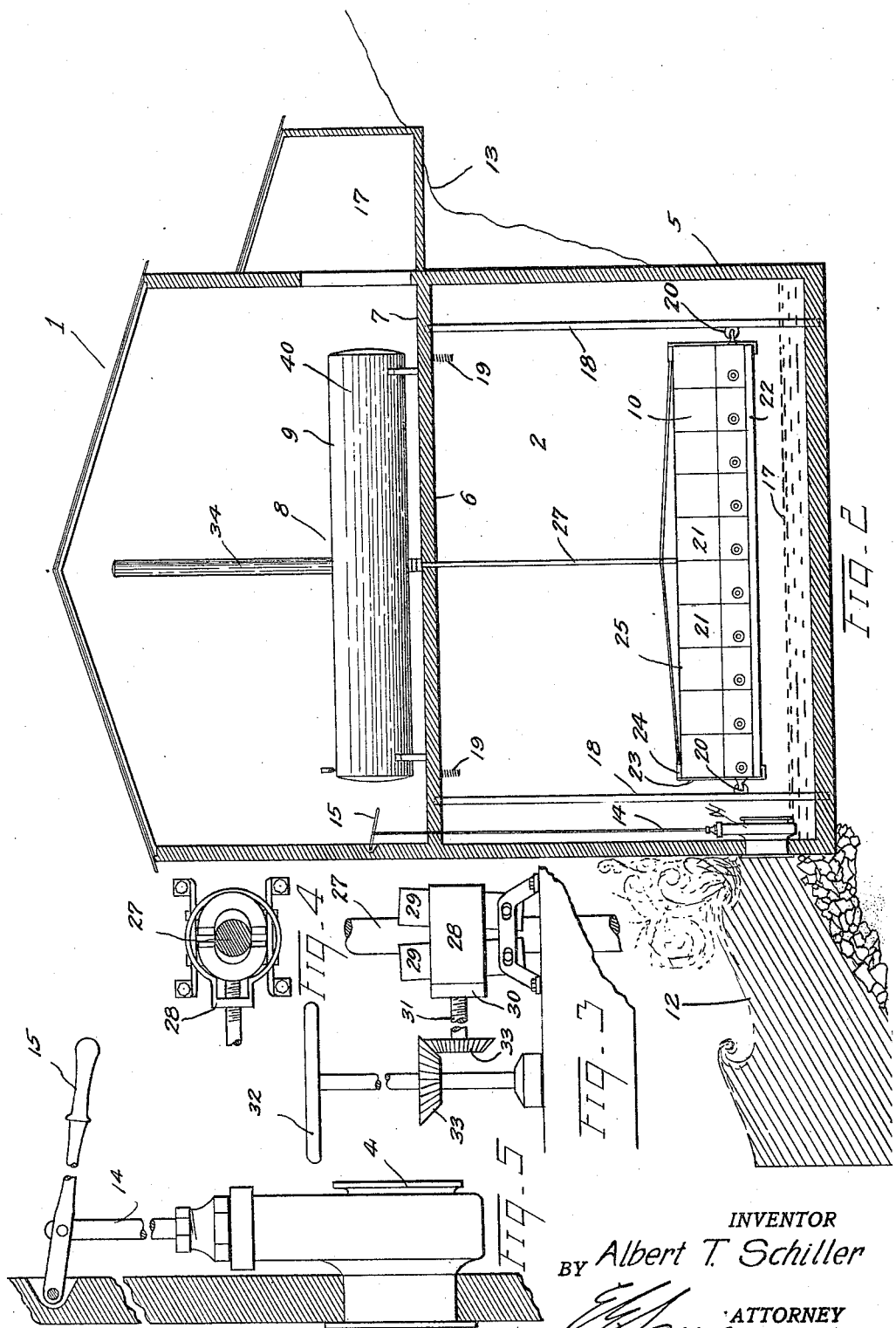

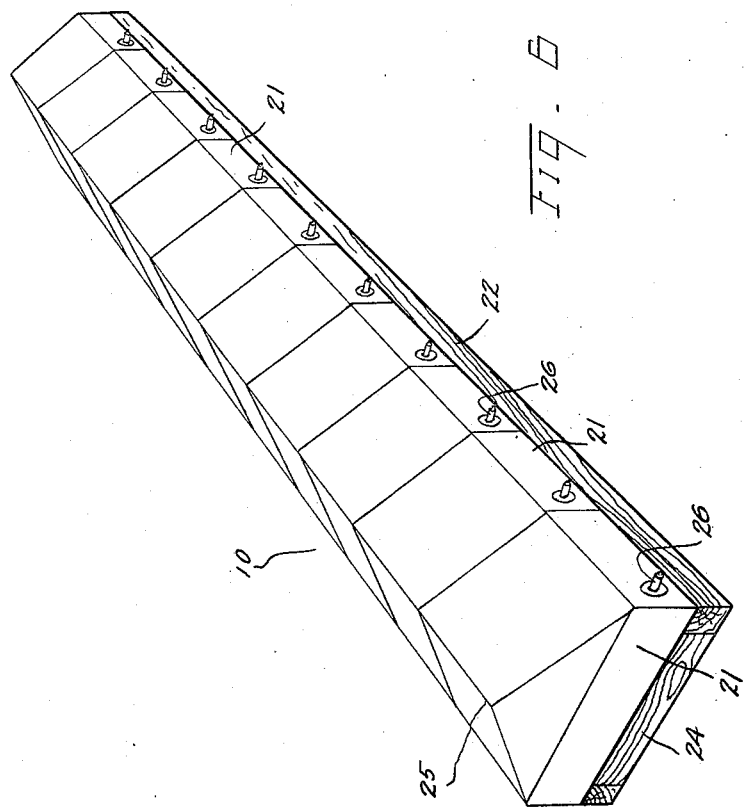

1,885,866

UNITED STATES PATENT OFFICE

ALBERT T. SCHILLER, OF WALLA WALLA, WASHINGTON

TIDAL MOTOR

Application filed August 23, 1930. Serial No. 477,212.

This invention relates to tidal motors and has an one of its objects to provide a motor that will operate through the medium of the rise and fall of tidal water.

Another object of the invention is to provide a tidal motor that is flexible in that its power may be increased to an indefinite amount by the addition of operating units.

A further object of the invention is to provide a tidal motor that by increasing its units may decrease the time interval between each action in the respective units, even until the frequency of action would provide practically a source of constant power.

A further object of the invention is to provide a tidal motor that is adapted to supply practically unlimited volume of air or water under pressure.

A further object of the invention is to provide a tidal motor whose principle makes it adapted for use regardless of the height of the flood tide.

A further object of the invention is to provide a tidal motor that will operate at the time periods of the change of tide and at other periods in regular cycles.

A further object of the invention is to provide a tidal motor that is to obtain power by sustaining the level of the flood or ebb tides past the natural period of time, in a separate body of water, for repeated use between tides.

With these other objects in view references is now had with the accompanying drawings in which Fig. 1 is a longitudinal cross section of the device showing a housing and tidal basin in section, and containing four units, the units being shown in alternate stages of their operation;

Fig. 2 is a transverse cross section of the housing showing its position with respect to the tide at ebb;

Fig. 3 is a side elevation of the clamping means adapted to secure the bouyant bodies both at high and low level of water, for release at proper intervals of time;

Fig. 4 is a plan view of said clamp;

Fig. 5 shows a fragment of the wall of the housing and a side elevation of one of the gates of the chambers;

Fig. 6 is a perspective view of a buoyant body assembled; and

Fig. 7 is a graph showing the operating periods of a cluster of four units.

Having reference to the drawings like numerals refer to like parts throughout the several views and the numeral 1 refers to the housing which housing contains a tidal basin consisting of a chamber 3 containing gates 4 and provided with a lower story 5 the ceiling 6 of which provides a floor 7 for an upper story 8, which upper story may contain the necessary machinery 9 to be operated by buoyant bodies 10, which in turn are operated in the said chambers 3.

The housing 1 may include an office structure 11 if desired.

The purpose of the above complete description of the housing 1 is to portray the general adaptability of the device to present day and ideal construction; the gates 4 being positioned to face the tide 12; the lower story 5 of the structure being raised only to the height of maximum flood tide; the upper story 8 being above and out of the reach of breaking waves; and the convenience of an office structure 11 in a position convenient to the shore line 13.

With the housing so constructed, and positioned with respect to tidal water, the lower story 5 will provide the tidal basin 2, which basin may be divided and subdivided to provide a multiplicity of the chambers 3 if desired, the number of chambers obviously depending on the quantity of air or water, or like effect, required for the work.

For the purpose of operating the device the chambers 3 must be filled and emptied according to the tide, and to control the influx and efflux therein from said tidal water the gates 4 may be of the usual construction, or as shown, and these gates will have an upwardly extending gate shaft 14, provided preferably with an operating lever 15 situated conveniently on the second floor of the housing, in the manner shown in Fig. 2.

While this manner of location and assembly of the gates is suitable for the work intended cessively, when the cycle of operation will be completed.

While four chambers constitute the basin in the drawings presented herewith obviously a bank of two chambers can be utilized to act in a like manner and at the same three hour period of time as against the six hour time period where only one buoyant body is used.

By the use of 3 or 6 chambers the period of time may be cut to an hour and half or in other words the decrease of the time period of operation will be in proportion to the number of chambers.

To accomplish the securement and release of the buoyant bodies for this purpose each buoyant body is provided with an upwardly extending shaft 27, projecting through the ceiling 6 of the chamber 3, to pass through a clamping means 28, which clamping means consists preferably of two oppositely positioned jaws 29 secured on the said shaft 27 at diametrically and oppositely positioned points of the shaft, securement being by means of a yoke, or collar 30, surrounding said shaft and jaws, while a screw 31 threadedly engaging the said collar 30 is provided to force the jaws together to securely clamp the said shaft at a pre-determined height, the operation of this clamp being typical, or as indicated in Figs. 3 and 4, in which figures a hand wheel 32 will be provided to operate said threaded member, operating through the medium of the bevel gears 33 shown.

By this means it is plainly evident that the action of the body 10 may be positively controlled, by securing or releasing the said clamps respectively, and at the predetermined or required time period, and that by performing this operation alternately, and by the proper manipulation of the gates, the proper action of the various buoyant bodies to give a uniform action will obtain.

To obtain this uniform action the intermittent action of the buoyant bodies must be converted to a steady action, and for this purpose a pump 34 is provided, which pump consists of the usual cylinder 35 having longitudinal and vertical dimensions approximating the height of tide, or more particularly equalling the movement of a piston 36 with the said shaft, the said shaft 27 now being utilized as a piston rod and secured thereon for engagement or operation with the said cylinder.

The cylinder is provided at its upper and lower ends with check valves 37 providing for the inlet of air drawn into said cylinder by the reciprocating action of the piston.

Other check valves, as at 38 permit of the expulsion of the air from the cylinder to a main pipe line 39 and this pipe line communicates with a storage tank 40 positioned conveniently to receive the air with a pressure provided by said pump and according to the impetuous action of said buoyant bodies.

Obviously water may be forced through the pump instead of air, as above mentioned, and if desired or advisable.

In use and assuming that the tide 12 is at its flood, the gates of the chamber will be opened and the chamber filled as rapidly as the size of the gate will permit, and immediately upon filling Nos. 1 and 3 of the buoyant bodies will be released by the clamp (obviously successively) and this action will operate the respective pumps connected therewith to force the volume of air contained within the cylinders of said pumps into the storage tank.

Owing to the buoyancy of this buoyant body it will remain at the top of the chamber until it can be secured by the operator by means of said clamp.

Three hours later (as shown) Nos. 2 and 3 buoyant bodies are released for like flotation and securement.

Three hours later at ebb tide, or at any time between the completion of the ascent of Nos. 2 and 4 at neap tide, the gates will be opened to permit the egress of the water contained in said chambers, and as soon as this is accomplished the gates are closed when Nos. 2 and 4 will be permitted to drop to the bumpers below, and hence by gravity.

The weight of the buoyant bodies provide a similar result in descent to that of ascent, and continuing three hours later Nos. 1 and 3 bodies are permitted to drop, and at the securement of all bodies by the said clamp the gates will be opened and the chambers permitted to fill by ingress of the tidal waters in the same manner as before described.

These actions are intermittent and would be in a general way unsatisfactory to provide power and hence the storage tank which is gradually being filled, as above described, will give a potential power that is uniform, steady and constant, and this power may be conveyed to its destination for use by any suitable means not shown.

By this means the basin is filled at, and by the water of, the flood tide; it is emptied at ebb tide; it is maintained in these respective conditions during the respective ebbing and flooding periods of time; and, by the reciprocatory movement of the tanks through the water in one direction, and unrestrictedly through the void in the other direction a cycle of maximum energy is obtained for power.

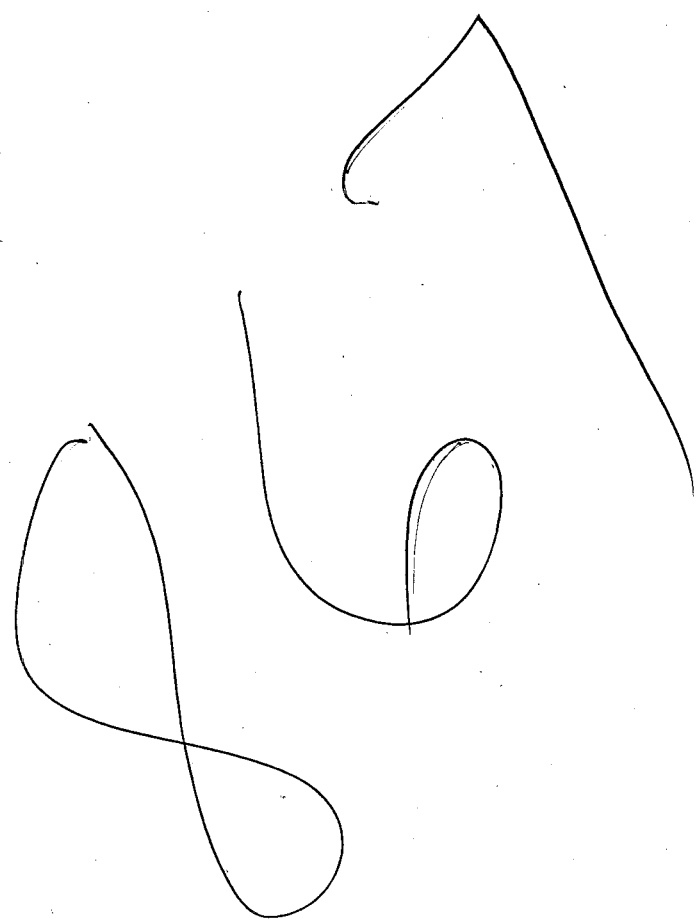

Having thus described my invention I claim:

1. In a tidal motor, a basin of water provided by and having a flood water level equaling the level of the flood tide, means to maintain the flood level until ebb tide, said means being adapted to reduce said level at ebb tide to the ebb level and to maintain said ebb level until flood tide, buoyant bodies in said basin, means to secure said bodies until flood level occurs and to release said bodies according to a predetermined plan to rise through said water during the sustained flood level, said means being adapted to secure said bodies until ebb level occurs in the basin, and to release said bodies according to the same plan to drop by gravity to the sustained ebb level, to provide a cycle of energy for each body during the flood and ebb cycle of time, and means to communicate and store the energy so provided for power.

2. In a tidal motor, a method of obtaining power from the tide consisting of filling a basin at flood tide; emptying the basin at ebb tide; maintaining the respective full and empty conditions of the basin during the respective ebbing and flooding periods of time; utilizing the filled condition of the basin to move a body by flotation through the water; and utilizing the empty condition of the basin to permit the unrestricted reciprocatory movement of the same body by gravity through the void, to provide power thereby.

3. In a tidal motor, a method of obtaining power from the tide consisting of filling a basin at flood tide; emptying the basin at ebb tide; maintaining the respective full and empty conditions of the basin during the respective ebbing and flooding periods of time; utilizing the filled condition of the basin to move buoyant bodies by flotation through the water at predetermined divisions of the ebbing period of time, to provide a half cycle of energy; and utilizing the empty condition of the basin to unrestrictedly move the same bodies by gravity at corresponding divisions the flooding period of time, to complete the cycle of energy, to provide power by the reciprocatory movement of said bodies.

In testimony whereof I affix my signature.

ALBERT T. SCHILLER.

Nov. 1, 1932.  W. E. SHARKEY  1,885,867
TAPE CUTTER
Filed Feb. 9, 1931  3 Sheets-Sheet 1
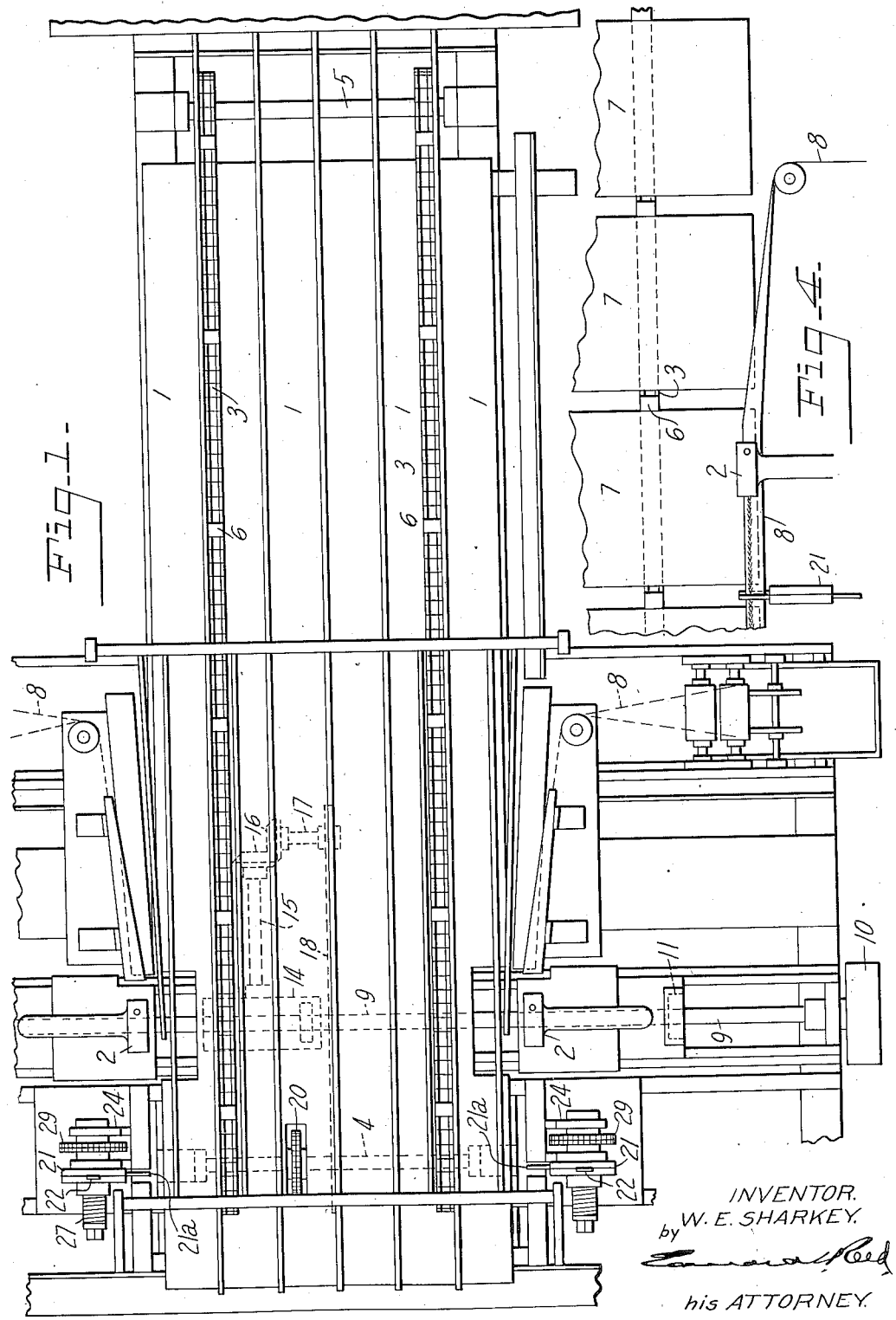
INVENTOR.
W. E. SHARKEY.
by
his ATTORNEY.